(12) United States Patent
Park

(10) Patent No.: US 6,648,537 B1
(45) Date of Patent: Nov. 18, 2003

(54) FINGER INSERTION TYPE WRITING DEVICE

(75) Inventor: Jun-Hyoung Park, Bucheon-si (KR)

(73) Assignee: Young-Jin Kim, Gyunggi-do (KR)

( * ) Notice: Subject to any disclaimer, the term of this patent is extended or adjusted under 35 U.S.C. 154(b) by 0 days.

(21) Appl. No.: 10/200,342

(22) Filed: Jul. 23, 2002

(30) Foreign Application Priority Data

May 23, 2002 (KR) ........................ 2002/28766

(51) Int. Cl.[7] .............. A46B 5/04; A46B 5/02
(52) U.S. Cl. ............................. 401/7; 401/8
(58) Field of Search ........................ 401/6–8

(56) References Cited

U.S. PATENT DOCUMENTS

| | | | | |
|---|---|---|---|---|
| 2,709,419 A | * | 5/1955 | Appel | 401/8 |
| 3,947,132 A | * | 3/1976 | Fox | 401/7 |
| 4,127,338 A | * | 11/1978 | Laybourne | 401/8 |
| 4,968,167 A | | 11/1990 | Kageyama | 401/31 |
| 6,315,477 B1 | | 11/2001 | Kuhn et al. | 401/32 |

* cited by examiner

*Primary Examiner*—Tuan N. Nguyen
(74) *Attorney, Agent, or Firm*—Jacobson Holman PLLC

(57) ABSTRACT

Disclosed is a finger insertion type writing device that is capable of being used for writing something down in the state of being fixed by a user's index finger, while it is not held by the user's other fingers, whereby he or she can continue to write down for a relatively long period of time, with no fatigue and even in the case that he or she doesn't write it down, he or she can use his or her fingers freely to thereby carry out any work using his or her fingers. As shown in FIG. 1, the finger insertion type writing device includes a main body(10), a support part(20) coupled to the main body(10) and a finger insertion part(30), said main body(10) taking a hollow shape with symmetrical pattern wherein a writing means(11) is inserted into internal hollow, said support part(20) coupled to said main body(10) is formed with a symmetrically curved part supporting said writing device by contacting one side of inserted finger in the finger insertion part(30), said finger insertion part(30) taking a hollow shape with the front side and the rear side opened, said finger insertion part comprising a hollow part serving as a finger insertion cavity, a symmetrically incised part formed on the one side thereof, on opposite side part to said symmetrically incised part(32) coupled to said main body.

3 Claims, 6 Drawing Sheets

FINGER INSERTION TYPE WRITING DEVICE

BACKGROUND OF THE INVENTION

1. Technical Field

The present invention relates to a finger insertion type writing device, and more particularly, to a finger insertion type writing device that is capable of being used for writing something down in the state of being fixed by a user's index finger, while it is not held by the user's other fingers, whereby he or she can continue to write it down for a relatively long period of time, with no fatigue and even in the case that he or she doesn't write it down, he or she can use his or her fingers freely to thereby carry out any work using his or her fingers.

2. Background Art

Writing devices are generally used for writing something down or drawing pictures, and examples of them are a pencil, a ball pen and a fountain pen, etc. Most of the writing devices are of a generally cylindrical shape and have to be supported by the thumb, index and long fingers for writing down. When the writing is carried out for a relatively long period of time with such conventional writing devices and according to its hand writing pattern, a user feels that his or her hand is very tired and especially, since a relatively strong force is applied on the side of the long finger during the writing, he or she can find out that his or her long finger is hardened on its side skin. In addition to the pattern of taking writing devices using the support of the three fingers, there are some other patterns of taking writing devices and it makes him or her having an undesirable writing habit. With the conventionally used writing devices, however, an undesirable writing habit may be caused in different forms.

With conventionally used writing devices, moreover, no additional work using user's fingers can be carried out, while he or she writes something down. For example, in order to use the mouse or keyboard of a computer, after the user separates his or her fingers from the writing device, he or she should do an action for operating the mouse or keyboard. Then, he or she should hold the writing device by using his or her fingers for writing it down again. Unfortunately, this makes his or her work delayed.

DISCLOSURE OF THE INVENTION

Accordingly, the present invention is directed to a finger insertion type writing device that substantially obviates one or more problems due to limitations and disadvantages of the related art.

An object of the present invention is to provide a finger insertion type writing device that is capable of being used for writing something down in the state of being fixed by a user's index finger, while it is not held by the user's other fingers, whereby he or she can continue to write it down for a relatively long period of time, with no fatigue and even in the state of being fixed by a user's finger, he or she can use his or her fingers freely to thereby carry out any work using his or her fingers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To accomplish this and other objects of the present invention, there is provided a finger insertion type writing device, comprising: a main body, a support part coupled to said main body and a finger insertion part, said main body taking a hollow shape with symmetrical pattern wherein a writing means is inserted into internal cavity, said support part coupled to said main body is formed with a symmetrically curved part supporting said writing device by contacting one side of inserted finger, said finger insertion part taking a hollow shape with the front and the rear side opened, said finger insertion part comprising a hollow part serving as a finger insertion cavity, a symmetrically incised part formed on the one side thereof, on opposite side part to said symmetrically incised part coupled to said main body.

According to a preferred feature of the invention, said main body further comprises a reentrant groove on left and right side thereof, facilitating the contact with the end of a user's finger.

According to a preferred feature of the invention, said main body further comprises a wireless computer mouse device instead of the writing means.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODES FOR CARRYING OUT THE PREFERRED EMBODIMENTS

Reference will now be made in detail to the preferred embodiments of the present invention, examples of which are illustrated in the accompanying drawings.

As shown in FIGS. 1 to 5, a finger insertion type writing device according to the present invention comprise a main body(10), a support part(20) coupled to said main body(10) and a finger insertion part(30), said main body(10) taking a hollow shape with symmetrical pattern wherein a writing means(11) is inserted into internal cavity, said support part(20) coupled to said main body(10) is formed with a symmetrically curved part(21) supporting said writing device by contacting one side of inserted finger in said finger insertion part(30), said finger insertion part(30) taking a hollow shape with the front and the rear side opened, said finger insertion part(30) comprising a hollow part serving as a finger insertion cavity(31), a symmetrically incised part (32) formed on the one side thereof, on opposite side part to said symmetrically incised part(32) coupled to said main body.

Figure 1:
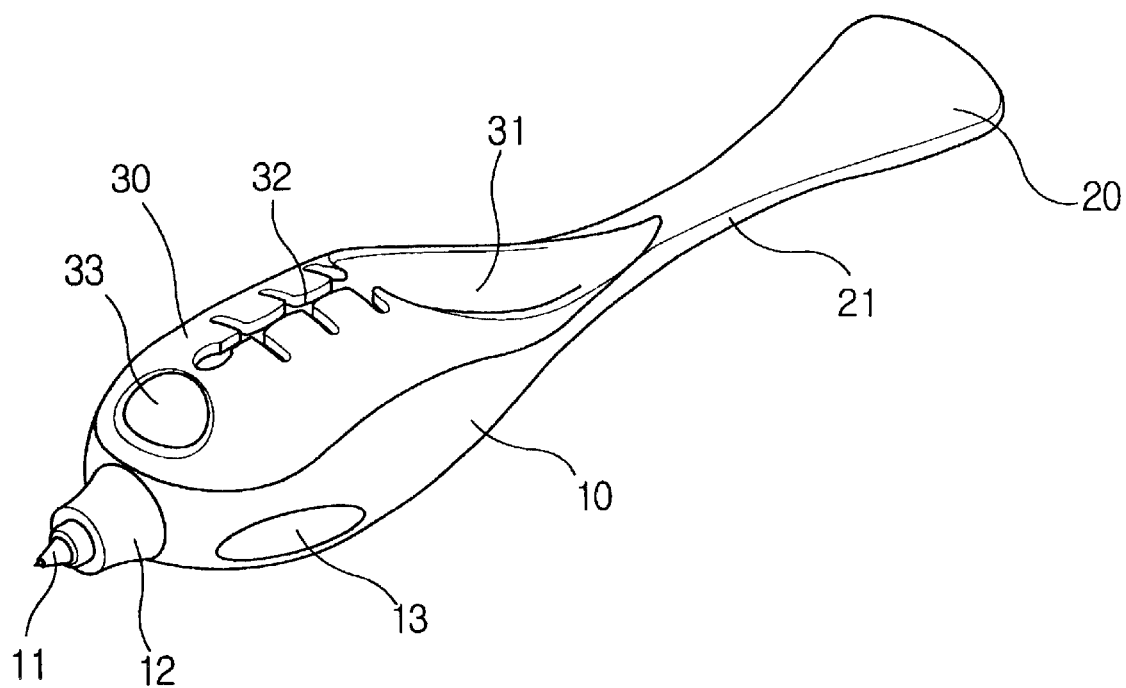
FIG. 1 is an outlined perspective view illustrating a finger insertion type writing device according to the first embodiment of the present invention.
Figure 2:
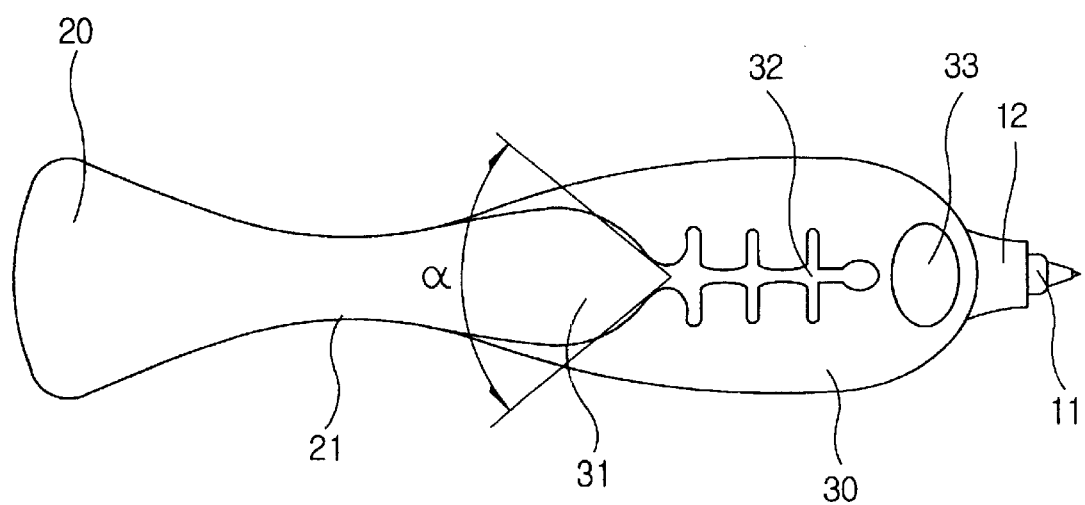
FIG. 2 is a rear view of the finger insertion type writing device as shown in FIG. 1.

As shown in FIGS. 1 and 2, said main body as a symmetrical hollow shape, the writing means(11) is inserted into internal cavity thereof and ball pen, sharp pencil, fountain pen, stylus of PDA(Personal Digital Assistants), wireless mouse device for computer system and wireless inputting pen for Auto CAD can inserted into internal hollow thereof instead of inserting the writing means. And if any writing devices have such structure and size as to be coupled to the internal hollow of the main body(10), all of them can be used irrespective of their shape or type. Because said stationary, writing devices and computer devices are commercially available in the market, alternatives, modifications and variations of one among those to be inserted instead of said writing means coupled the main body is apparent to those skilled in the art.

In case of inserting the writing means(11) into said main body(10), a holder(12) is formed for easy insertion of the writing means(11) into the main body(10) and preventing the writing means from being separated from said main body. Insertion of said holder(12) into said main body(10) is generally performed with screwing down method. And to apply general fixation method such as pressing insertion method for fixation the holder(12) into the main body(10) is apparent to those skilled in the art.

Figure 6:
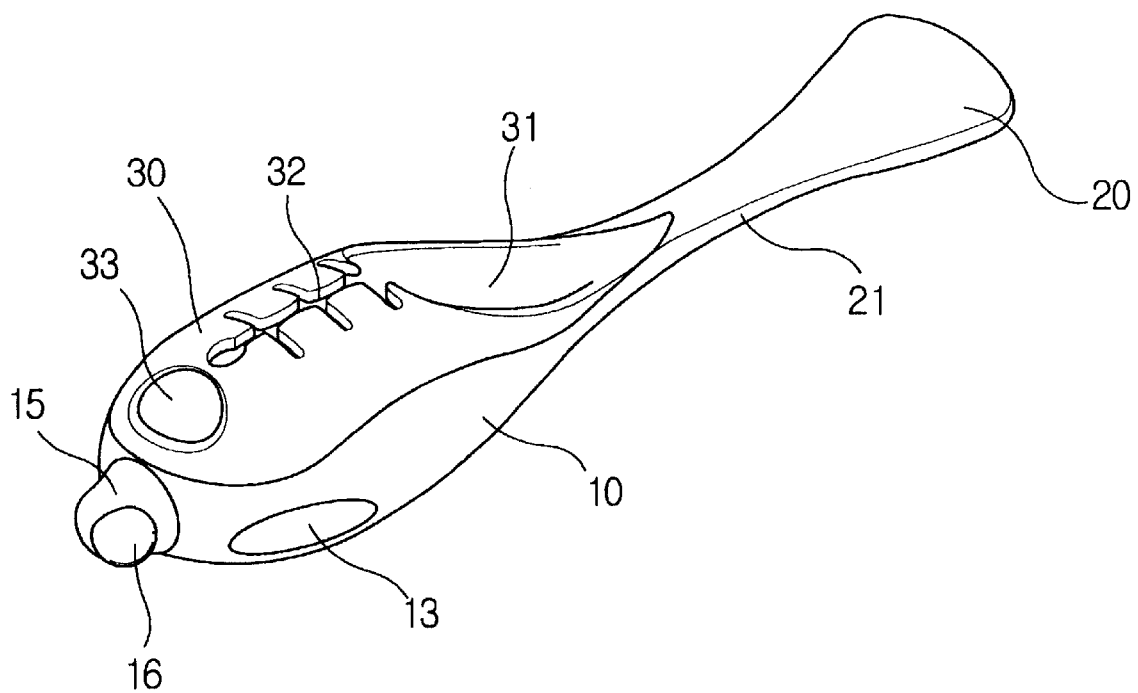
FIG. 6 is an outlined perspective view illustrating a finger insertion type writing device according to the second embodiment of the present invention.

In addition, a wireless computer mouse device(15) is inserted into said main body(10) as shown in FIG. 6. As shown in FIG. 6, in case of installing the wireless computer mouse, installing method is varied depend on specification and operation of computer mouse types, and in case of wheel computer mouse, sensor wheel(16) is located where the writing means(11) is placed on for serve as a computer mouse as shown in FIG. 6. In case of installing the wireless computer mouse(15), even a wire computer mouse is also available, it is apparent to those skilled in the art to use wireless computer mouse for convenience and a transmitter-receiver radio device for wireless computer mouse can be placed in the main body(10). Placing a transmitter-receiver radio device in said main body shares a common embodiment of wireless computer mouse and it is apparent to those skilled in the art.

Said support part(20) coupled to said main body(10) is formed with a symmetrically curved part(21) supporting said writing device by contacting one side of inserted finger in finger insertion part(30). When said main body is molded, the support part can be molded together with. To support writing device by user's hand, the curved part(21) of said support part(20) forms a gentle slope for tight contact between counter positioned thumb and index finger so as to support the writing device according to present invention by one side of inserted finger in finger insertion part(30) when the finger insertion type writing device according to the present invention is fixed with finger inserted in said finger inserted part(30).

Figure 3:
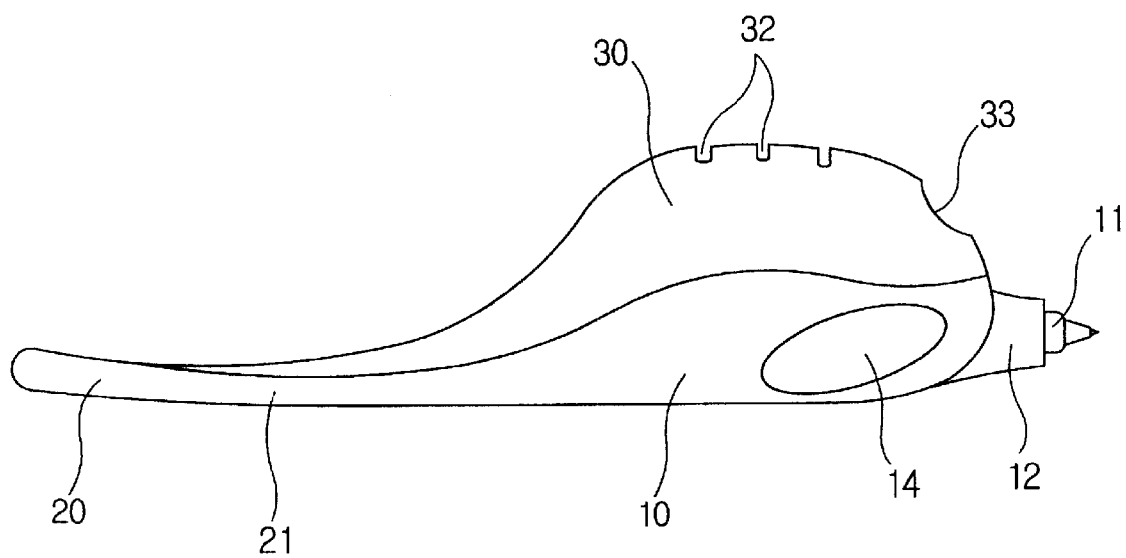
FIG. 3 is a side view of the finger insertion type writing device as shown in FIG. 1.
Figure 4:
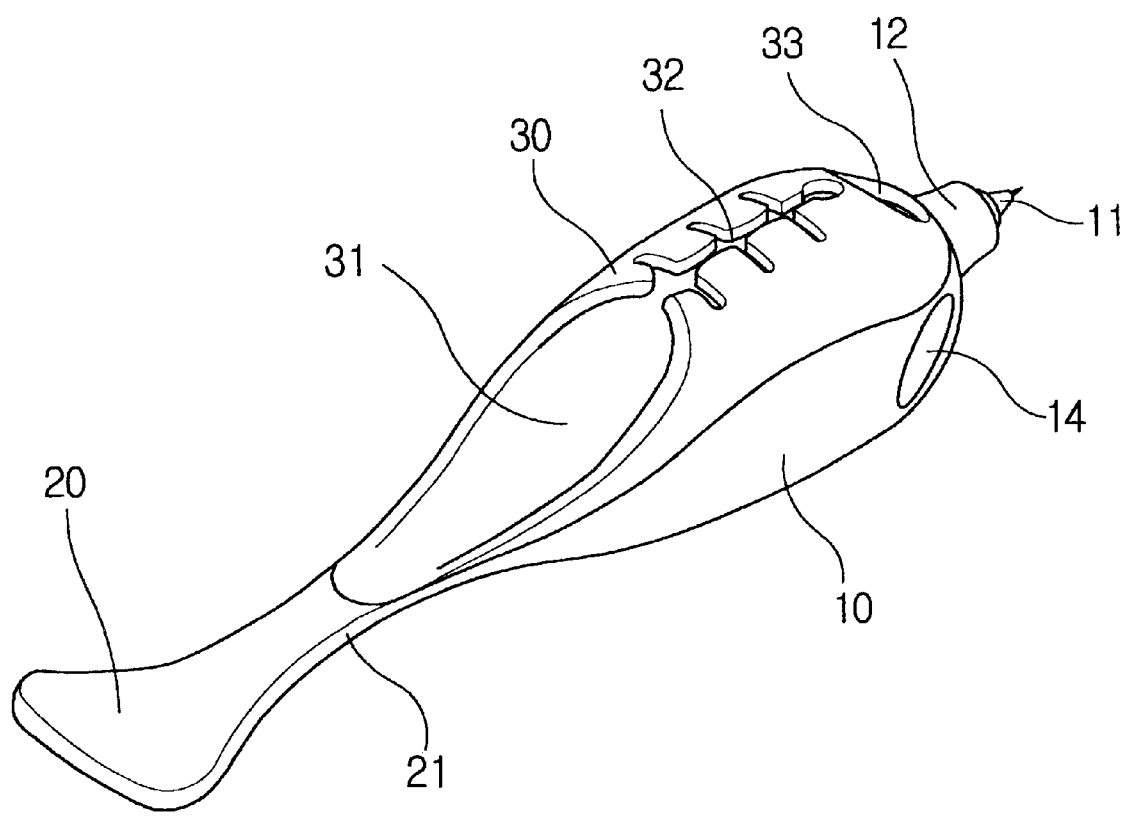
FIG. 4 is a perspective view illustrating FIG. 2 in which the finger insertion part is uppermost.
Figure 5:
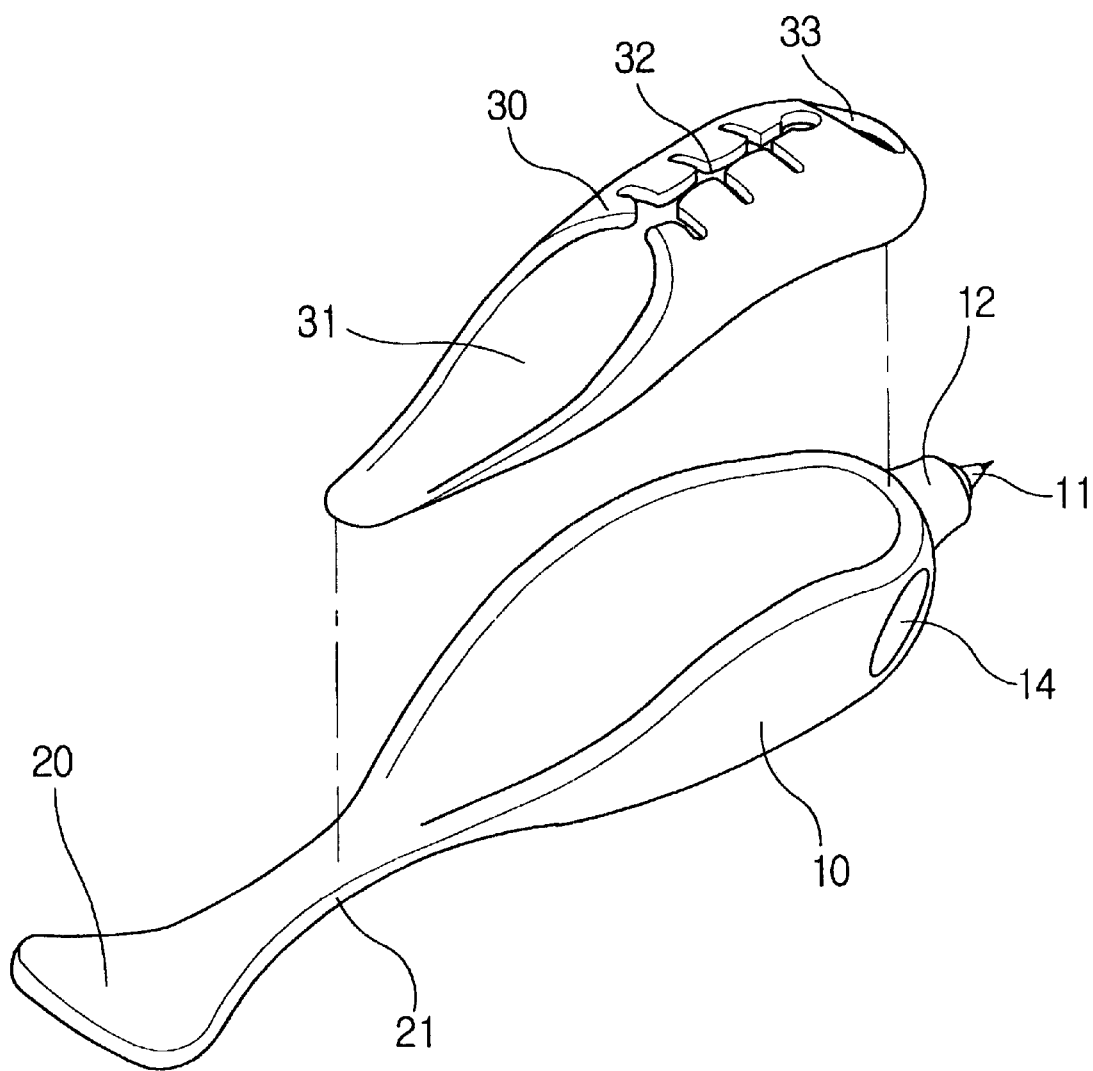
FIG. 5 is a perspective view illustration detailed the finger insertion type writing device by separating the main body and the finger insertion part.

As shown in FIGS. 1 and 3, the finger insertion part(30) takes the hollow shape with the front and the rear side opened. The finger insertion part(30) is provided with the hollow part serving as the finger insertion cavity(31), the symmetrically incised part(32) formed on the one side thereof, on opposite side part to said symmetrically incised part(32) coupled to said main body(10). The internal cavity of said hollow shape serve as a insertion cavity(31), the internal cavity is designed to be adaptable with finger in size. The finger insertion cavity(31) is placed on the hollow of the hollow part and takes a substantially cylindrical shape, into which the thumb or the index finger of the user's left or right hand is inserted. The finger insertion cavity(31) having the first opened part(33) at front and because of existence of the first opened part(33) at front, the finger insertion cavity(31) is opened throughout the internal cavity, with which it is well ventilated even long latent finger insertion in the finger insertion cavity(31), and prevent the finger insertion cavity from being in a sweat. The symmetrically incised part(32) is formed on one side of the finger insertion part(30) to be adjusted the inside diameter of the insertion cavity to finger insertion without any regard to inserting finger size into the insertion cavity(31). The incised part(32) having a symmetrically incised pattern is adjusted the inside diameter at the insertion cavity to be acceptable any fingers without regard to thumb, index finger and size of hands. That is, with the incised part(32), the inside diameter of the finger insertion part(30) is flexible by inserting finger in size. The incised part(32) is formed by making the part of the finger insertion part(30) appropriately cut. That is, the symmetrically incised part 21 is made by cutting from the margin of the rare portion opened so called the cutting portion of finger insertion point of the finger insertion part 20 of the hollow shape to the intermediate portion thereof. The incised part (32) is desirably symmetrically cut partly along the length direction of the finger insertion part 20 of the hollow shape and further cut partly along the direction perpendicular to the length direction. Upon the formation of the incised part(32), moreover, the cutting angle $\alpha$ of the first incised part(32) thereof is in a range from 20° to 70°, and preferably in a range from 30° to 60°. The cutting angle $\alpha$ increases the curved degree of freedom of the inserted thumb or index finger such that the user can write something down by making his index finger freely curved. If the cut angle $\alpha$ is less than 20°, the inlet of the incised part(32) becomes too narrow such that it makes the curved degree of freedom of the index finger reduced. Thereby, he or she cannot move the finger freely, which makes him or her feel uncomfortable for writing it down. To the contrary, if the cutting angle $\alpha$ is more than 70°, the inlet of the incised part(32) becomes too large such that it makes the movement of the index finger not engaged with the writing device 10. Thereby, he or she cannot write down freely.

Left and right side of the main body(10) is further provided with a reentrant groove 13 for facilitating the contact with the end of the user's finger. The reentrant groove 13 is formed on the portion where the end part of the thumb gets in contact in case of inserting user's thumb into said finger insertion part(30), when the user holds the writing device by his or her hand, for the purpose of improving the holding capability against the writing device. Also, a second reentrant groove(14) can be formed on the portion opposite to the reentrant groove(13), for the purpose of improving the contact with the end of the long finger when the end part of the thumb gets in contact with the reentrant groove 26. Also said reentrant groove(3) and second reentrant groove(14) serve to improve the holding capability against the writing device by contacting other fingers when user insert his or her thumb into said finger insertion part(30).

According to the finger insertion type writing device of the present invention, the main body(10), the support part

(20) and the finger insertion part(30) except the writing means, a stationary and a computer device inserted into the main body(10) can be molded in injection molding with insert in a mold, which will be easily understood by those skilled in the art. The injection molding is carried out in such manners that resin is injection-molded in the mold into which an insert corresponding to the part to be formed as a cavity, for example, the finger insertion cavity(31) of the present invention is poured and the space between the inner shape of the mold and the outer insert is filled by the resin. The mold, the production of the insert, and the injection molding manner will be of course understood by those skilled in the art. Specifically, the finger insertion part(30) of the finger insertion type writing device according to the present invention may be molded with an elastic material such as rubber on the whole part or the part thereof around the finger insertion cavity(31), and the elastic material can be of course commercially available in any market.

Now, the operation of the finger insertion type writing device according to the present invention will be described in detail.

In case of using user's index finger inserted into the insertion cavity, if a user is to write something down with the finger insertion type writing device according to the present invention, he or she inserts his or her index finger into the finger insertion cavity(31) of the finger insertion part(30) of the writing device and then holds the writing device by surrounding the finger insertion part(30) with his or her thumb and long fingers. In this case, the thumb finger is disposed on the top end of the writing device coupling the main body(10), more preferably on the reentrant groove(13) thereon, and the long finger comes in contact with the side opposite to the reentrant groove(13) of the writing device coupling the main body(10), thereby making it possible to firmly hold the writing device. In this state, he or she can write it down only with substantially little force. In addition, he or she can carry out additional work using his or her hand, for example, he or she uses a keyboard or mouse of a computer, while the writing device is being fixed on his or her index finger. Since the finger insertion part(30) is made of an elastic material such as rubber, he or she can freely move his or her hand in the state where his or her index finger is fixed on the finger insertion type writing device and can feel that no pressure is applied on his or her index finger, which enables the writing device to be carried with himself or herself during the work. The symmetrically incised part (32) provided on the finger insertion part(30) can be applied to any index finger of the user's left and right hands, and if he or she has the relatively large index finger in size, the inside diameter of the finger insertion cavity(31) can be adjusted such that the relatively large index finger can be inserted thereinto. More particularly, the formation of the cutting angle α of the first incised part of the incised part(32) of the finger insertion part(30) enables the writing device to be freely held by the insertion of any index finger of the left and right hands and also enables the writing device to be effectively held with the curved part(21) of said support part(20) having curved form enabling close contact to one side of finger inserted into said finger insertion part(30). More particularly, said support part(20) having symmetrically curved part(21) can closely contact with one side of finger inserted any of left or right hands into said finger insertion part(30), and because of elevated the curved degree of freedom in state of insertion of finger, it makes user doing writing work and other work with simple and easy way even he or she is left handed or right handed.

Even though, the operation of the finger insertion type writing device according to the present invention was explained in case of using user's index finger inserted into the insertion cavity, the operation of the finger insertion type writing device is also available when user use his or her thumb instead of using his or her index finger. More over, the writing means, other ball pens, sharp pencil, fountain pens, stylus of PDA, other wireless computer mouse(15) and wireless pen for Auto CAD can be inserted and wherein a various work can be performed with simple way.

As clearly appreciated from the above, the finger insertion type writing device according to the present invention is capable of carrying out a writing operation and another work using any index finger of user's left and right hand with ball pen, sharp pencil, fountain pen, stylus of PDA, other wireless computer mouse(15) and wireless pen for Auto CAD including the writing means inserted into main body and wherein a various work can be performed with simple and easy way. With the distribution of a force by the reentrant groove(13) upon the insertion of the index finger and the application of the force and with the formation of the cutting angle α of the first incised part of the incised part(32) of the finger insertion part(30), the formation of curved part(21) of the support part(20), the writing device can be freely held by the insertion of any thumb or index finger of the left and right hands and also the curved degree of freedom of the inserted finger can increase such that the index finger freely moves in the state of being inserted into the finger insertion cavity 24. And, the user can carry out any separate work using his or her hand in a simple and easy manner, while having the writing device on his or her index finger.

Additionally, the finger insertion type writing device according to the present invention is configured on the basis of the structure of the human body such that it enables the writing operation to be carried out with the consumption of a substantially light force, while giving very little load to the human body. Even in case where the writing operation is carried out for a long period of time, it can protect the long finger from being hardened on the skin of the one side and can prevent the original shape of the hand from being varied or deformed.

Moreover, the finger insertion type writing device according to the present invention is capable of having the writing device and computer device on the thumb or index finger in the state of being not held by the thumb and long fingers, such that the user can carry out any additional work using his or her hand excepting inserted finger into the finger insertion part(30), while he or she always holds the writing device. Thus, with free movement of the rest of fingers he or she can improve his or her working efficiency.

The forgoing embodiments are merely exemplary and are not to be construed as limiting the present invention. The present teachings can be readily applied to other types of devices. The description of the present invention is intended to be illustrative, and not to limit the scope of the claims. Many alternatives, modifications, and variations will be apparent to those skilled in the art.

What is claimed is:

1. A finger insertion type writing device, comprising: a main body, a support part coupled to said main body and a finger insertion part, said main body taking a hollow shape with symmetrical pattern wherein a writing means is inserted into internal cavity, said support part coupled to said main body is formed with a symmetrically curved part supporting said writing means by contacting one side of inserted finger, said finger insertion part taking a hollow shape with the front side and the rear side opened, said finger insertion part comprising a hollow part serving as a finger insertion cavity, a symmetrically incised part formed on the one side thereof, on opposite side part to said symmetrically incised part coupled to said main body.

2. The finger insertion type writing device as defined in claim 1, wherein said finger insertion part further comprises a reentrant groove on left and right side of said finger insertion part facilitating the contact with the end of a user's finger.

3. The finger insertion type writing device as defined in claim 1, wherein said finger insertion part further comprises a wireless mouse device instead of a writing means.

* * * * *